(12) United States Patent
Trozzi

(10) Patent No.: US 7,588,267 B2
(45) Date of Patent: Sep. 15, 2009

(54) ACTIVE VEHICLE IMPACT DAMPENING SYSTEM

(76) Inventor: Nick Trozzi, 8939 Sylmar Ave., Panorama, CA (US) 91402

( * ) Notice: Subject to any disclaimer, the term of this patent is extended or adjusted under 35 U.S.C. 154(b) by 105 days.

(21) Appl. No.: 11/716,821

(22) Filed: Mar. 12, 2007

(65) Prior Publication Data

US 2008/0224458 A1    Sep. 18, 2008

(51) Int. Cl.
*B60R 21/34* (2006.01)
(52) U.S. Cl. .................. 280/748; 280/762; 280/770; 180/232; 180/281
(58) Field of Classification Search .............. 280/748, 280/751, 753, 762, 770; 180/232, 271, 274, 180/281; 340/903; 701/45
See application file for complete search history.

(56) References Cited

U.S. PATENT DOCUMENTS

| | | | | |
|---|---|---|---|---|
| 1,560,460 A * | 11/1925 | Yates et al. | ................ | 303/6.01 |
| 2,452,110 A * | 10/1948 | Dourte | ...................... | 280/767 |
| 2,677,516 A * | 5/1954 | Pilling | ................... | 244/103 R |
| 3,708,194 A * | 1/1973 | Amit | .............................. | 293/1 |
| 5,646,613 A * | 7/1997 | Cho | ............................ | 340/903 |
| 5,732,785 A * | 3/1998 | Ran et al. | .................... | 180/271 |
| 5,887,895 A * | 3/1999 | Easter | ........................ | 280/762 |
| 5,959,552 A * | 9/1999 | Cho | ............................ | 340/903 |
| 6,106,038 A * | 8/2000 | Dreher | ........................ | 293/118 |
| 6,170,594 B1 * | 1/2001 | Gilbert | ........................ | 180/282 |
| 6,227,325 B1 * | 5/2001 | Shah | .......................... | 180/274 |
| 6,408,237 B1 * | 6/2002 | Cho | ............................ | 701/45 |
| 6,749,218 B2 * | 6/2004 | Breed | ......................... | 280/735 |
| 6,757,611 B1 * | 6/2004 | Rao et al. | .................... | 701/301 |
| 6,883,631 B2 * | 4/2005 | Hu et al. | ...................... | 180/274 |
| 6,923,483 B2 * | 8/2005 | Curry et al. | ................. | 293/107 |
| 6,950,014 B2 * | 9/2005 | Rao et al. | .................... | 340/438 |
| 7,232,001 B2 * | 6/2007 | Hakki et al. | ................ | 180/271 |
| 7,359,782 B2 * | 4/2008 | Breed | ......................... | 701/45 |
| 7,481,285 B1 * | 1/2009 | Savage | ....................... | 180/8.1 |
| 7,543,677 B2 * | 6/2009 | Igawa | ......................... | 180/274 |
| 2002/0093180 A1 * | 7/2002 | Breed | ....................... | 280/730.1 |
| 2007/0215402 A1 * | 9/2007 | Sasaki et al. | ................ | 180/232 |
| 2007/0227799 A1 * | 10/2007 | Watzka et al. | ............... | 180/274 |
| 2007/0246925 A1 * | 10/2007 | Mani | .......................... | 280/751 |
| 2007/0256877 A1 * | 11/2007 | Melz et al. | .................. | 180/271 |
| 2007/0267239 A1 * | 11/2007 | Engels et al. | ............... | 180/281 |
| 2008/0093150 A1 * | 4/2008 | Schramm et al. | ............ | 180/274 |
| 2008/0111334 A1 * | 5/2008 | Inoue et al. | ............... | 280/124.1 |
| 2008/0257671 A1 * | 10/2008 | Jacob et al. | ................. | 188/377 |

OTHER PUBLICATIONS

Dan Neil "An Auto Concept Heavy on Steel and High Tech Safety" Los Angelos Times Bussiness Section May 22, 2009.

* cited by examiner

*Primary Examiner*—Paul N Dickson
*Assistant Examiner*—Karen Jane J Amores

(57) ABSTRACT

A vehicle safety system, vehicle (10) air bladders (12) hydraulic jacks (14) solution spray nozzles (16) front, rear absorber eject out bumpers (18) cluster sensing unit (20) dual door brace to interlock with eject out absorbers to body frame (22) single door brace to interlock with eject out absorbers to body frame (24) stand alone eject out door brace without interlock to body frame (26) interlock with eject out absorbers to body frame to dual door brace (28) interlock with eject out absorbers to body frame to single door brace (30) air bags (32).

1 Claim, 7 Drawing Sheets

ACTIVE VEHICLE IMPACT DAMPENING SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

Figure 1:
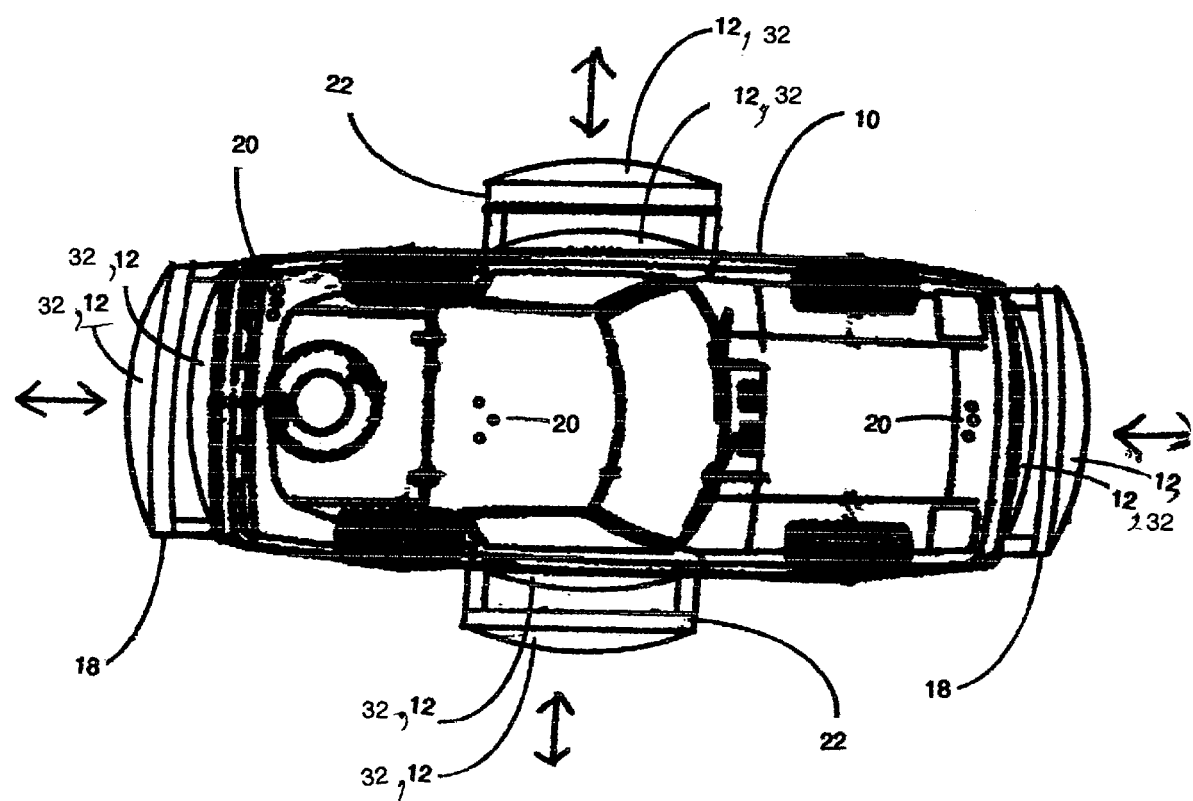

This Invention Relates To A Better Occupant Vehicle Safety Outcome, For The Victims Of Vehicle Crashes, Specifically All Vehicles.

2. Background of the Invention

All Companies Selling Vehicles That Could Have A System Of Greater Safety Protection For The Occupants Of Vehicle Crashes.

OBJECTS AND ADVANTAGES

Accordingly, besides the objects and advantages of the, Active Vehicle Impact Dampening System, described in my above patent, several objects and advantages of the present invention are:

(a) to provide a safety system for a much safer area within the vehicle for the occupants, during an accident (b) to provide a safety system to also minimize the injuries to the occupants of other vehicle also, during an accident.

(c) to provide a safety system to minimize the costs of the damage to the vehicles.

(d) to provide a safety system to maximize the confidence of the occupants that they are in the safest vehicle produced.

SUMMARY

In accordance with the present invention of a Vehicle safety system having absorbing, shock absorbers and braces and air bags and air bladders around the exterior of the vehicle.

DRAWINGS

Figures

In the drawings closely related figures have the same number but different alphabetic suffixes.

Figure 1B:
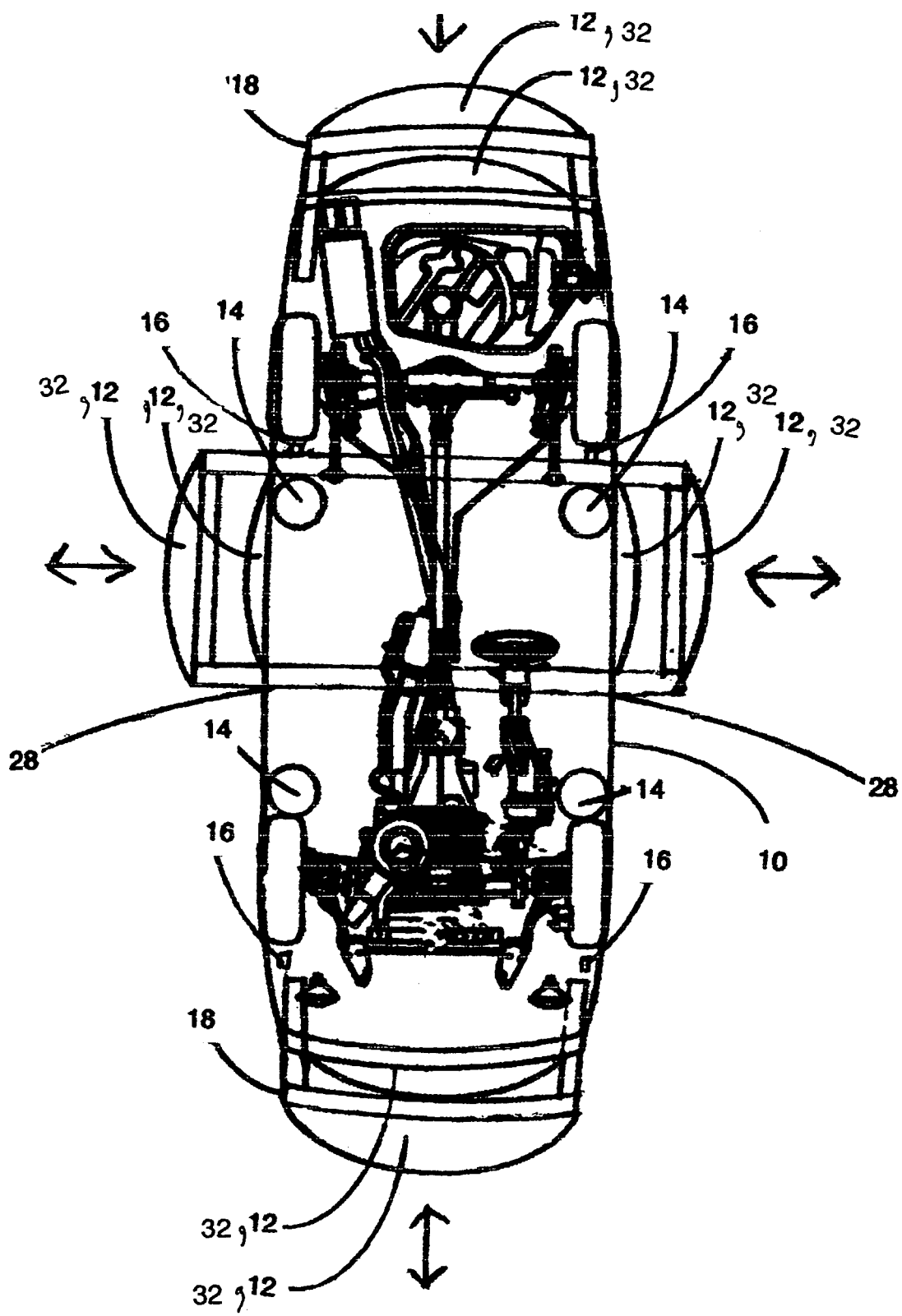
Figure 1C:
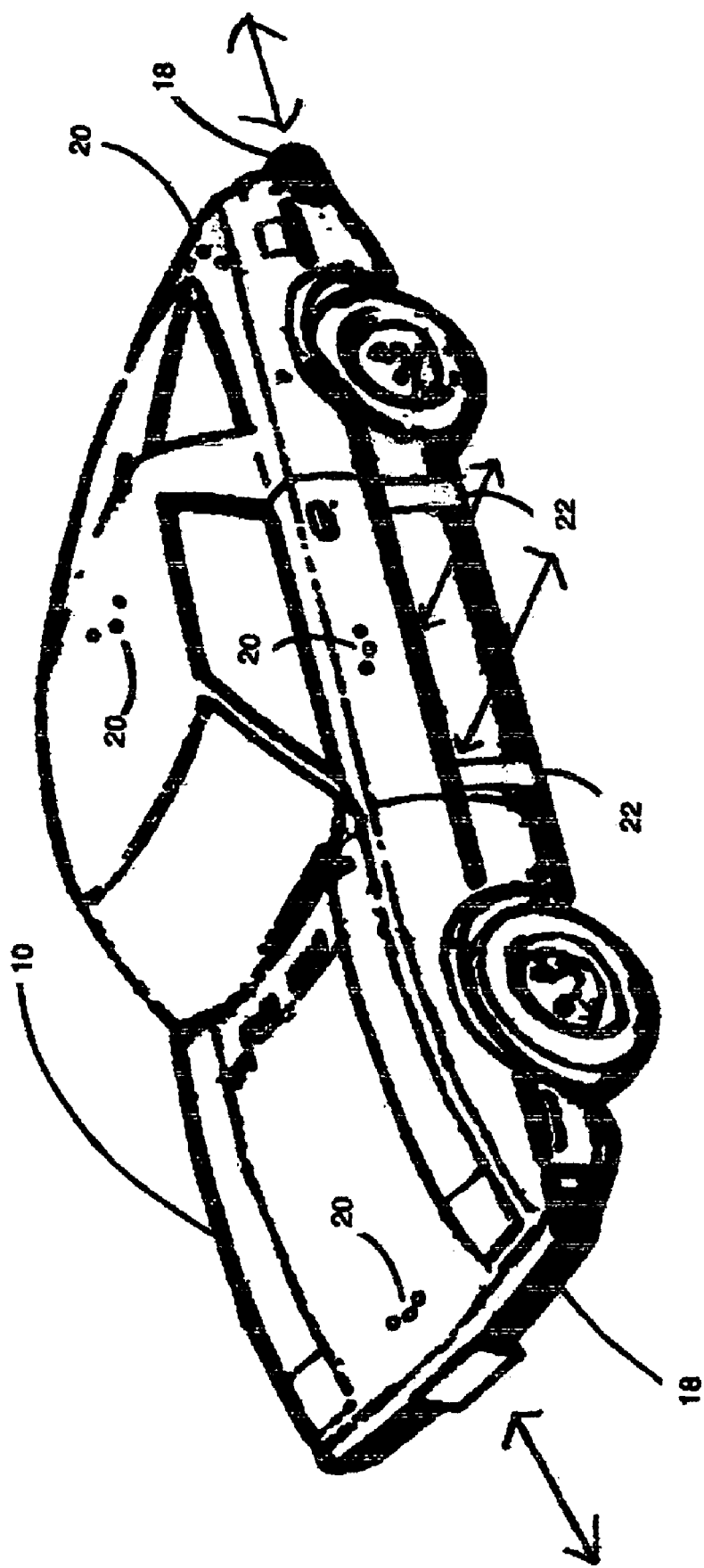

FIGS. 1A to 1C shows a vehicle form top, bottom, and side views of a dual door brace, and front and rear bumper version with a interlock to frame eject out absorbers to body frame system. To dampen the force of approaching vehicles causing a collision. This system will lesson the full impact to the exterior to the vehicle, which will allow the vehicle occupants a greater safety margin. There will be less damage to the exterior of vehicle, also lower the rate of injuries sustained by the occupants.

Figure 2:
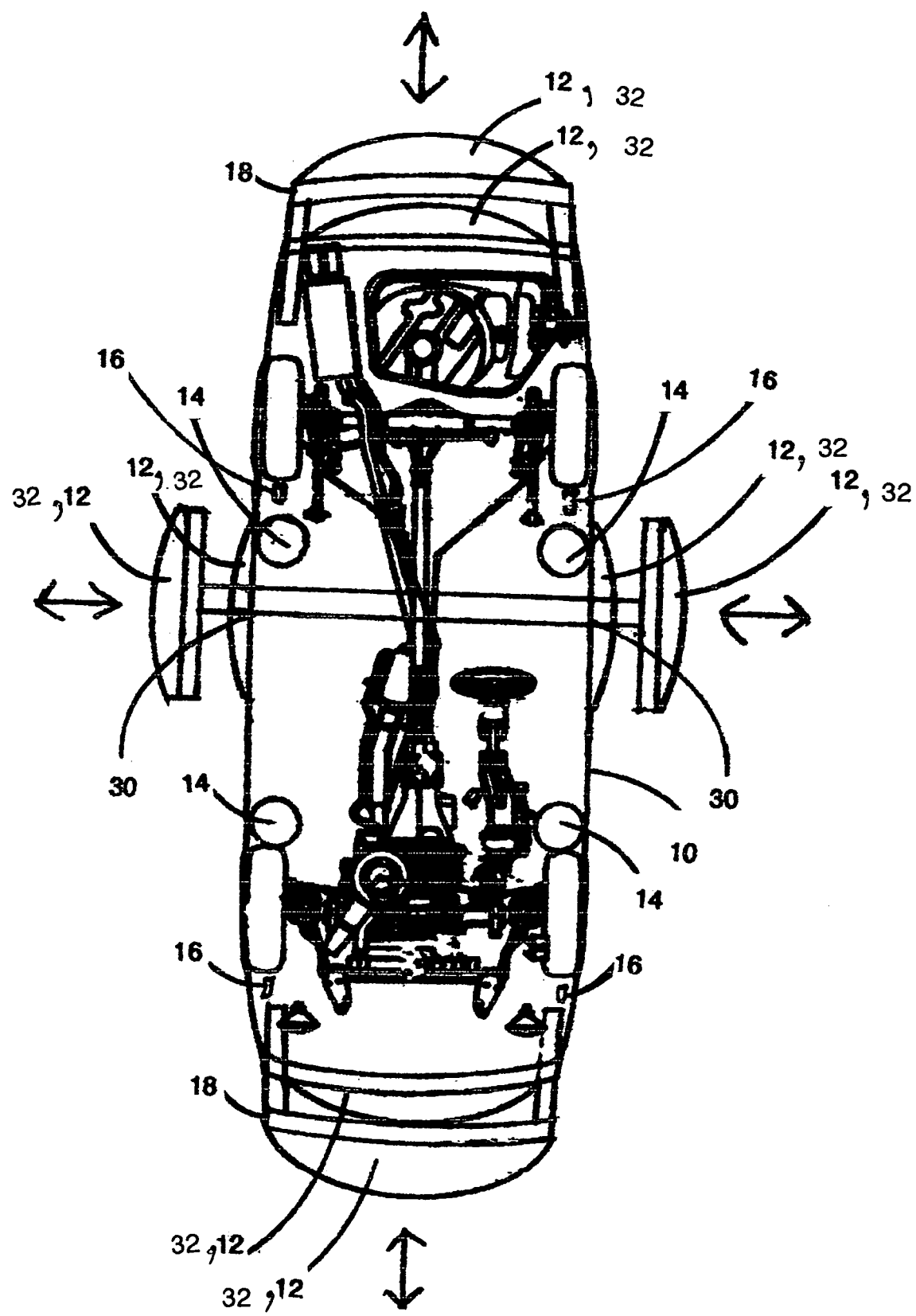
Figure 2B:
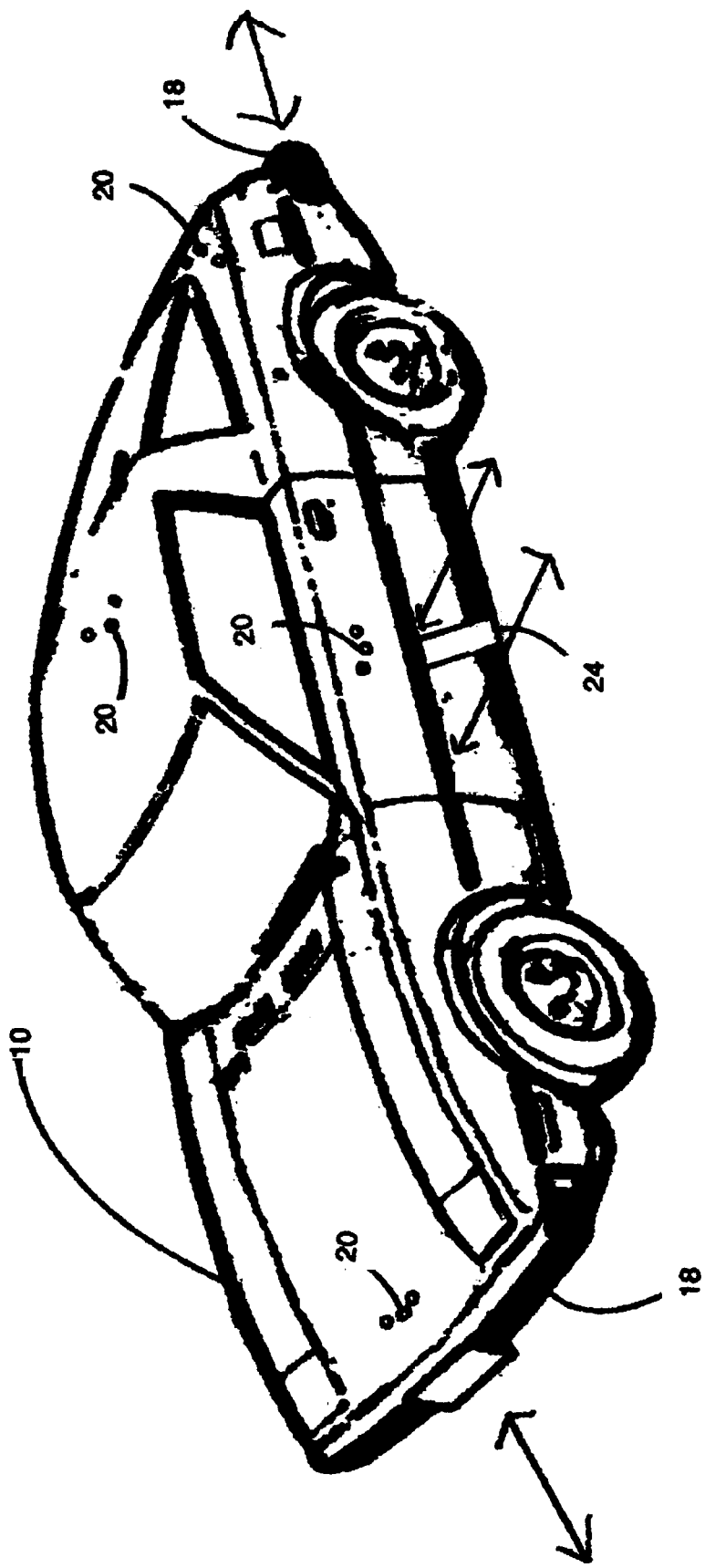

FIGS. 2A and 2B shows a vehicle form side and bottom views. Of a single door brace ,and front and rear bumper version with a interlock to frame eject out absorbers to body frame system. To dampen the force of approaching vehicles causing a collision. This system will lesson the full impact to the exterior of the vehicle, which will allow the vehicle occupants a greater safety margin. There will be less damage to the exterior of the vehicle, also you will be able to minimize the rate of injuries sustained by the occupants.

Figure 3:
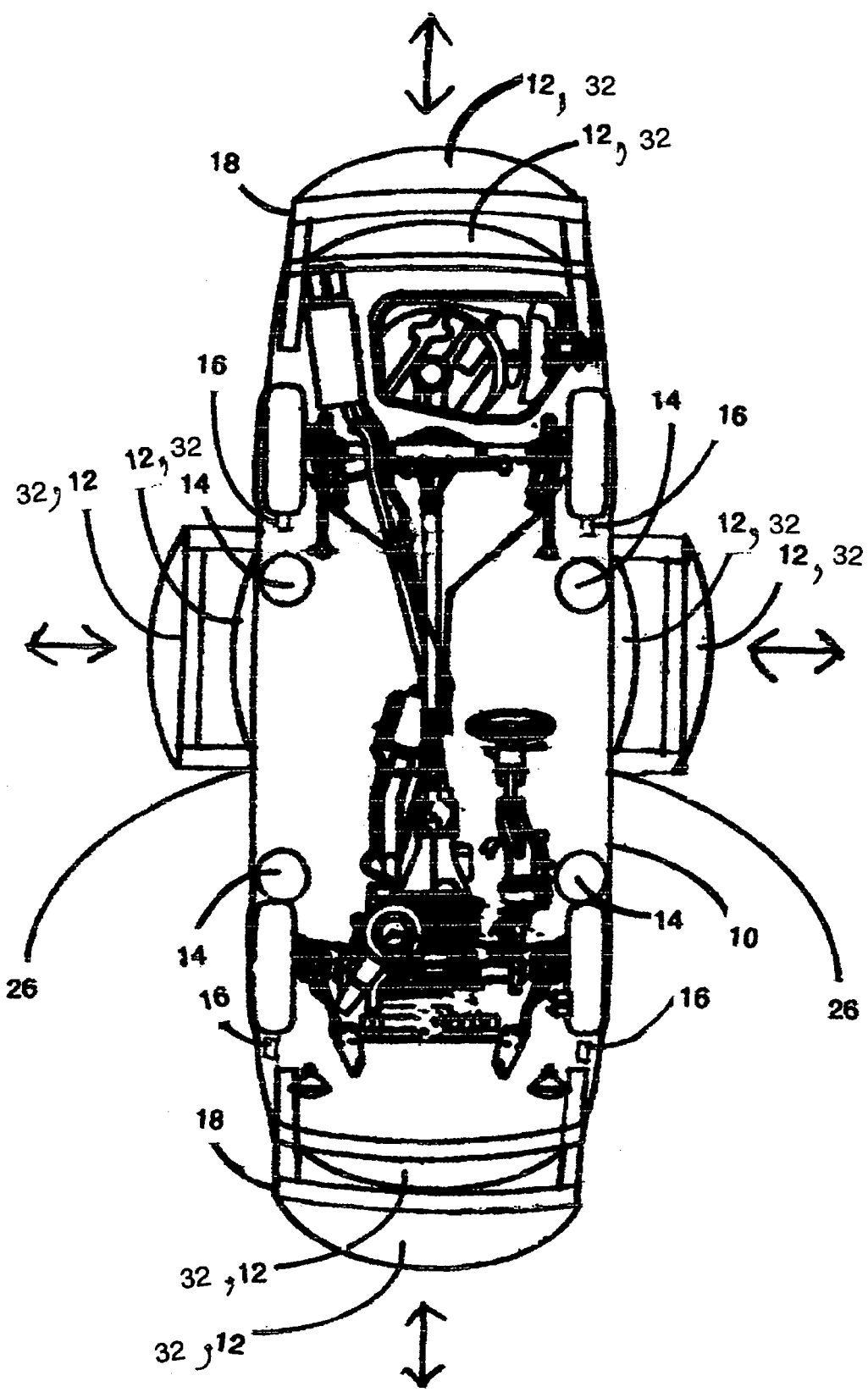
Figure 3:
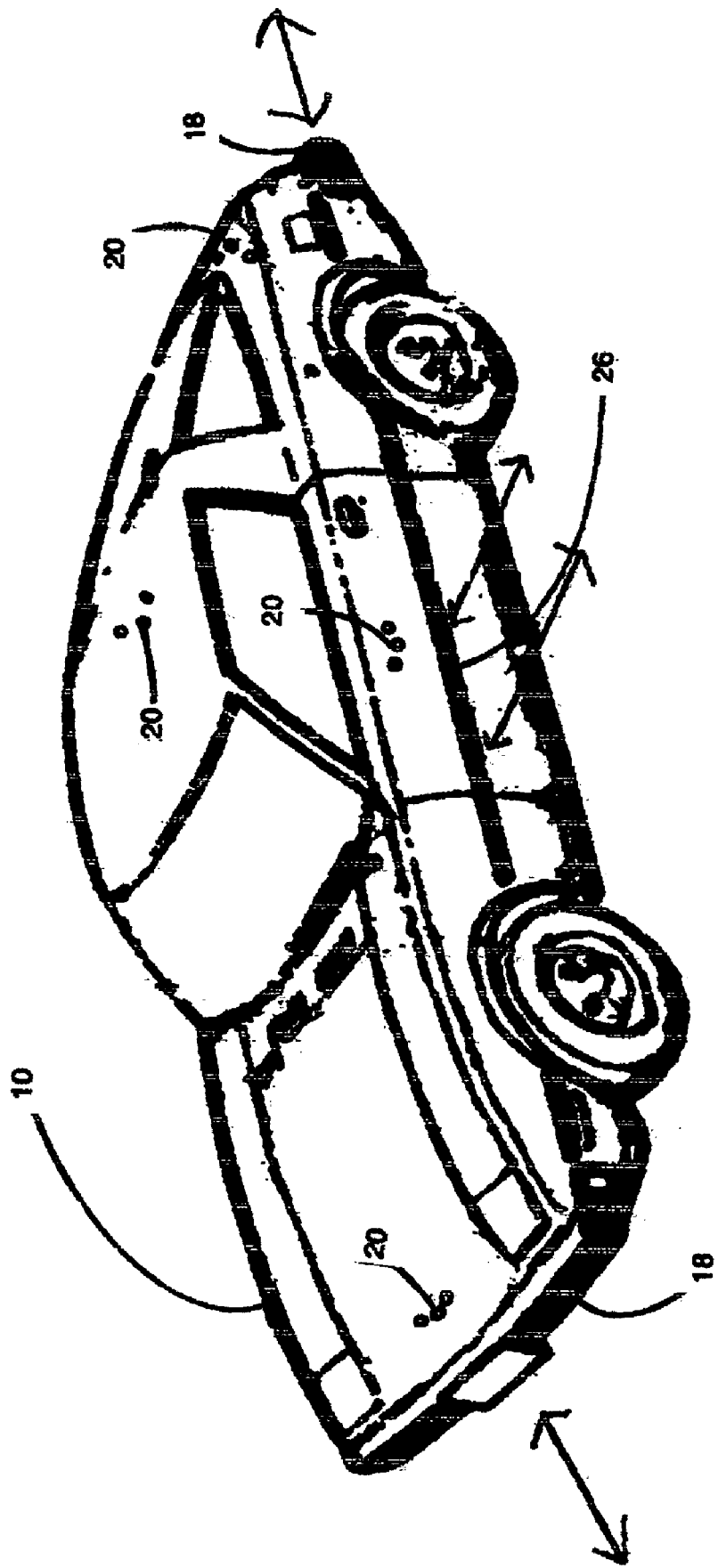

FIGS. 3A and 3B shows a vehicle from side and bottom views. Of stand alone door brace eject out absorber ,and front and rear eject out bumper version ,with no interlock to frame eject out absorbers system. To dampen the force of approaching vehicles causing a collision. This system will lesson the full impact to the exterior to the vehicle, which will allow the vehicle occupants a greater safety margin. There will be less damage to the exterior of the vehicle, also lower the rate of injuries sustained by the occupants.

DRAWINGS

Reference Numerals

10 vehicle
12 air bladders
14 hydralic jacks
16 solution spray nozzles
18 front, rear absorber eject out bumpers
20 cluster sensing unit
22 dual door brace to interlock with eject out absorbers to body frame
24 single door brace to interlock with eject out absorbers to body frame
26 stand alone eject out door brace without interlock to body frame
28 interlock with eject out absorbers to body frame to dual door brace
30 interlock with eject out absorbers to body frame to single door brace
32 air bags

DETAILED DESCRIPTION

FIGS. 1A, 1B, 1C,2A,2B,3A,3B—Preferred Embodiment

A preferred embodiment of the "Active Vehicle Impact Dampening System," is illustrated in FIG. 1A (top view),and FIG. 1B (bottom view), FIG. 1C (side view) this is a vehicle. The vehicle 10 has a external air bladder 12, air bag system 32 they will be deployed if another vehicle is detected to be on a collision course with the system equipped vehicle, at a certain rate of speed. This will work in conjunction with hydraulic jacks 14 that will raise the vehicle for a split second, at the impact of the collision so the car will slide enough to lesson the full impact, because if this is not done the tires will cause the vehicle to have maximum traction at impact and because of this greater force is incurred, causing greater damage, think of it working like a bumper car at a amusement park, the cars get more freely pushed off their original spot causing less of a jolt and damage to the vehicle, and lesson injuries to the occupants. And , or a alternative way of achieving this same result would have solution spray nozzles 16 ready to spray a solution towards the base of the tires to lesson the traction of the tires just prior to impact this would cause a short period of hydroplanning so the vehicle would not be planted onto the pavement because of the superior technology of our tires today. During a collision traction is a bad thing. Next part of system is the front, rear absorber eject out bumpers 18 at the point a collision is going to occur at dangerous speeds, these bumpers will eject out along with the air bladders 12, and air bags 32, to dampen the force of the collision causing less damage to the vehicle, also lessening the damage to the occupants of the vehicle. Next is the laser, radar, camera duster sensing unit 20. Any combinations of this unit could be used to sense in a fraction of a second to deploy which parts of the system would work the best and would deploy them before the collision, not after like present day air bags strategic placing of this duster or clusters is needed to obtain maximum time to deploy all correct system items necessary for a maximum positive out come. Dual brace door to interlock with eject out absorbers to body frame version 22. This is the part of the system that is most active, the interlock is deactivated when occupants need to enter or exit the vehicle. All other times the interlock is activated and connected. The interlock with eject out absorbers to body frame to dual door brace 28. Together 22 and 28 are part of the system which would dampen collisions headed at the door sections. The system would deploy ejecting out the brace from the body of the doors, air bags and air bladders would deploy under more extreme collisions to help support the braces. The interlocks which are at the base of the doors are connected and the absorbers in the body frame under the vehicle eject out the braces giving the vehicle a external barrier, before it would collide with the main body of the vehicle. This would reduce damage to the vehicle, and reduce injuries to the occupants. FIG. 2A(bottom view) and FIG. 2B(side view) this version of system uses 10, 12, 14, 16, 18,20,32, same as above information, 22 and 28 are excluded from this version. Added are single door brace to interlock with eject out absorbers to body frame 24, also interlock with eject out absorbers to the body frame to single door brace 30. this version works the same way as version, FIG. 1A,FIG. 1B,FIG. 1C, except there is only a single brace. FIG. 3A(bottom view)and FIG. 3B (side view)this version of the system uses 10, 12, 14, 16, 18,20,32 same as above information 22,24,28,30 are excluded from this version. Added are stand alone eject out door brace without interlock to body frame 26. this version does not use a interlock, it is a stand alone version ,with the eject out absorbers attached so the frame of the door helps support this version at point of impact.

OPERATION

FIGS. 1A, 1B, 1C,2A,2B,3A,3C

The manner of using the active vehicle impact dampening system to protect occupants of vehicle and to minimize injuries from vehicle collisions, also to minimize the damage to the vehicle. This is achieved in this sequence. First the laser, radar, camera duster sensing unit 20, senses that a collision is going to occur, in a fraction of a second it ,it would calculate how fast the vehicle is going to be struck by the advancing other vehicle. Depending on the speed of the collision, system activates only system equipment needed. Also only activate system equipment in the sections of the vehicle needed. Slowest registered speeds will not activate any of the system equipment, but the faster the speeds are almost all, or system equipment is activated. At points of impact in a slow collision just 18,20,22,24,26,28,30,will be activated system version dependant But at high speed collision, will activate 12, 14, 16, 18,20,22,24,26,28,30,32 system version dependant. The duster sensing unit 20 will sense a oncoming collision, braces, bumpers, 18,22,24,26,28,30, will activate out in the affected sections of the vehicle, the air bladders 12 and air bags will deploy 32, hydraulic jacks will raise 14, or solution spray nozzles will spray the tires 16. The vehicle 10 will be spared greater injuries to the occupants of owners of vehicles with vehicle system, also minimize vehicle damages, and cost for hospital bills and vehicle repair bills. Also less people will be accidentally ejected from their vehicles.

CONCLUSION, RAMIFICATIONS, AND SCOPE

Accordingly, the reader will see that the active vehicle impact dampening system will make driving a vehicle a safer option.

It allows you to maximize your chance to walk away from a collision unhurt

It allows you to minimize vehicle damage.

It allows you piece of mind that you are driving the safest car design on the road.

It allows the other vehicle in a collision to have less injuries, and damages.

Although the description above contains specifities, these should not be construed as limiting the scope of the invention but merely providing illustrations of some of the presently preferred embodiments of this invention. For example there could be other shapes and descriptions of the invention above.

Thus the scope of the invention should be determined by the claims rather than example.

I claim:

1. A body carriage having a cluster sensing unit comprising of one or more of a laser, radar and camera detection, such that when the sensing unit senses an impact, a vehicle impact dampening system activates:

an interlock, connected to a side body door brace, projecting outward the sides;

front and rear absorbers to eject out bumpers from an under carriage of the body carriage or inflate front and rear absorbers from the body of the body carriage;

air bags and/or air bladders tucked into the side body door brace;

spray nozzles to spray a solution on the pavement of which tires of the body carriage ride over, causing a temporary decrease in traction of the tires, and decrease impact to the body carriage causing less trauma to an occupant;

also in the case the body carriage is not moving during the time of the impact, jacks will activate, slightly raising the body carriage so the tires are not making contact to the ground, causing a decrease in traction from the tires, causing less trauma to occupants;

such that all parts of the vehicle impact dampening system work in conjunction to dampen the impact to the body carriage lessening the trauma to the occupants.

* * * * *